United States Patent [19]
Lee et al.

[11] Patent Number: 5,636,154
[45] Date of Patent: Jun. 3, 1997

[54] DIGITAL OPERATION UNIT

[75] Inventors: Bang-won Lee, Sungnam; Young-heon Lim, Suwon, both of Rep. of Korea

[73] Assignee: Samsung Electronics Co., Ltd., Suwon, Rep. of Korea

[21] Appl. No.: 435,315

[22] Filed: May 5, 1995

[30] Foreign Application Priority Data

May 9, 1994 [KR] Rep. of Korea .................. 94-10095

[51] Int. Cl.⁶ ........................................... G06F 7/38
[52] U.S. Cl. ............................................. 364/736
[58] Field of Search ................................. 364/736

[56] References Cited

U.S. PATENT DOCUMENTS 4,996,661  2/1991  Cox et al. ........................... 364/736
5,282,150  1/1994  Yamada ............................. 364/736
5,493,521  2/1996  Oota .................................. 364/736

*Primary Examiner*—Tan V. Mai

[57] ABSTRACT

A digital operation unit includes a dual-port arithmetic logic unit (ALU) receiving data from a data bus and a plurality of registers selectively storing ALU computations. The digital operation unit also including a first set of switches connected between the ALU the registers, a second set of switches connected between the registers and one of the dual ALU input ports, and a third set of switches connected in parallel with the second between the registers and the data bus.

6 Claims, 2 Drawing Sheets

DIGITAL OPERATION UNIT

BACKGROUND OF THE INVENTION

The present invention relates to a digital signal processor, and more particularly, to a digital operation unit using multiple registers.

In general, a digital operation unit includes an arithmetic logic unit and a register. FIG. 1 is a block diagram illustrating the structure of a conventional digital operation unit consisting of an arithmetic logic unit (ALU) 10 operable to execute various arithmetic and logical operations, a register 20 storing data output from ALU 10, a bus 30 for transmitting data, switches 40a and 40b controlling data transmission on bus 30, and switches 50a and 50b controlling transmission of data output from register 20.

Data output from ALU 10 of the conventional digital operation unit is stored in only register 20. Accordingly, an external memory (not shown) connected to bus 30 is required to perform operations on data output from ALU 10. That is to say, in order to execute a variety of complex arithmetic and logical operations, frequent data shifts to and from an external memory are necessary because of the single data register 20. This requirement lowers the overall operating speed of the digital signal processor.

SUMMARY OF THE INVENTION

In view of the foregoing, the present invention provides a digital operation unit which executes complex arithmetic and logical operation without numerous data shifts to and from an external memory.

To accomplish this, a digital operation unit according to the present invention comprises; an arithmetic logic unit receiving data via first and second ALU input ports, and generating results of arithmetic and logical operations of the data, a plurality of registers storing the results, a plurality of first switches connected between the arithmetic logic unit and the plurality of registers, and controlling transmission of data between same, a plurality of second switches connected between the plurality of registers and the first ALU input port, and controlling transmission of data between same, and a plurality of third switches connected between the plurality of registers and the second ALU input port, and controlling transmission of data between same.

BRIEF DESCRIPTION OF THE DRAWINGS

The above advantages of the present invention will become more apparent by describing in detail a preferred embodiment thereof with reference to the attached drawings in which.

DETAILED DESCRIPTION OF THE INVENTION

Figure 1:
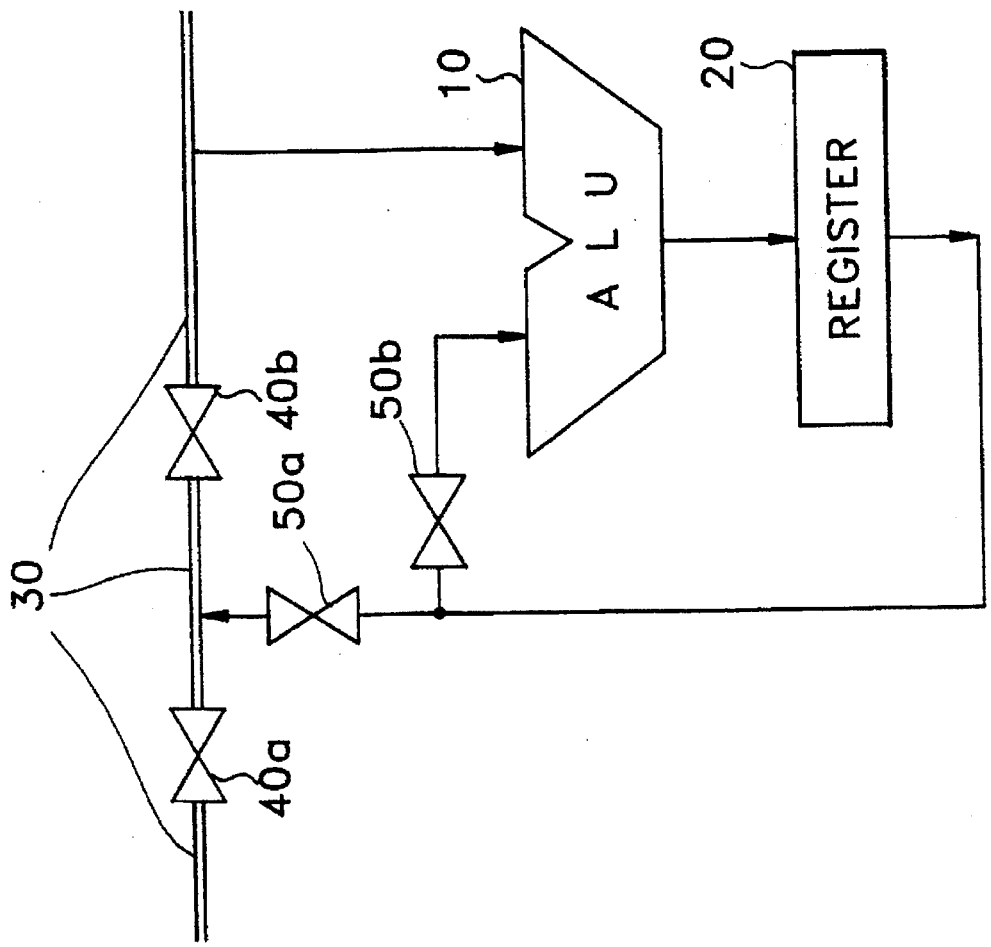
FIG. 1 is a block diagram for explaining the structure of a conventional digital operation unit.
Figure 2:
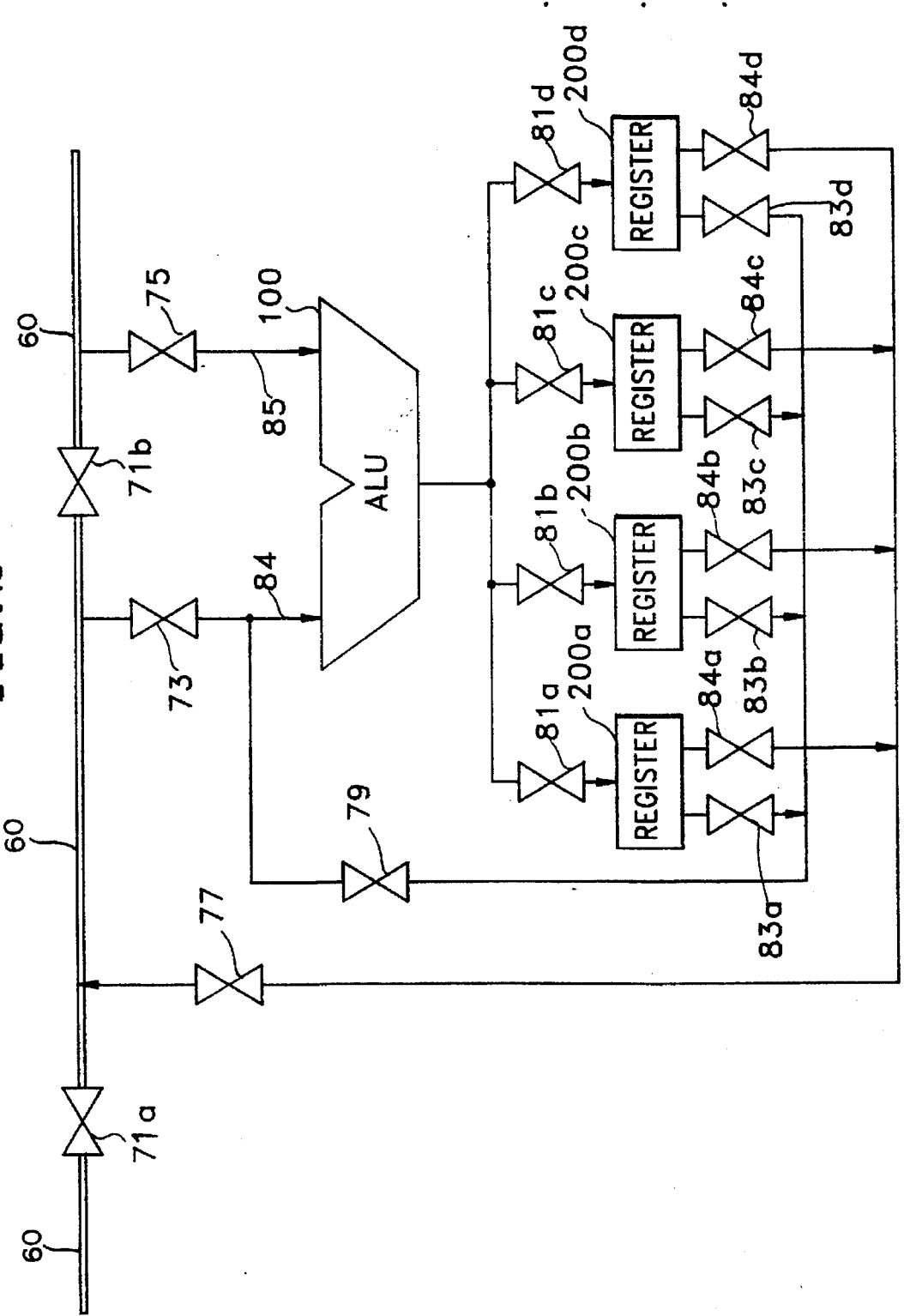
FIG. 2 is a block diagram for explaining the structure of a digital operation unit according to the present invention.

A digital operation unit according to the present invention and shown in FIG. 2 comprises an arithmetic logic unit (ALU) 100 executing arithmetic and logical operations; registers 200a, 200b, 200c and 200d storing operation results from the ALU 100; switches 81a, 81b, 81c and 81d respectively connected between ALU 100 and registers 200a, 200b, 200c and 200d and controlling transmission of data from ALU 100; switches 83a, 83b, 83c and 83d respectively connected between a first ALU input port 84 and registers 200a, 200b, 200c and 200d and controlling transmission of data from registers 200a, 200b, 200c and 200d; switches 84a, 84b, 84c and 84d respectively connected between a bus 60 and registers 200a, 200b, 200c and 200d, and controlling transmission of data from registers 200a, 200b, 200c and 200d; switches 71a and 71b controlling transmission of data via bus 60; switches 73 and 75 respectively connected between bus 60 and first and second ALU input ports 84 and 85; a switch 79 connected between switches 83a, 83b, 83c and 83d and first ALU input port and a switch 77 connected between bus 60 and switches 84a, 84b, 84c and 84d.

Alternatively, in the place of switches 77 and 79, switches 83a, 83b, 83c and 83d may be directly connected to first ALU input port 84, and/or switches 84a, 84b, 84c and 84d may be directly connected to bus 60. In the foregoing configuration, respective switches 71a, 71b, 73, 75, 77, 79, 81a to 81d, 83a to 83d, and 84a to 84d may be CMOS transmission gates having their ON/OFF operations controlled according to an external control signal(s) (not shown). Additionally, the type of operation performed by ALU 100 is selected according to one or more external control signals.

The transmission of data from bus 60 to register 200a, for example, will now be described. If switches 83a and 79 are turned ON, data from register 200a is input to first ALU input port 84. If switches 71a, 71b and 75 are turned ON, data is input to second ALU input port 85 from bus 60. Operation of ALU 100 is selected by an external control signal (not shown) and ALU 100 executes the operation on the two data inputs. Subsequently, results of the operation are stored in one or more of registers 200a, 200b, 200c, and/or 200d according to switches 81a, 81b, 81c and/or 81d.

ALU operation with respect to data respectively stored in registers 200a and 200b will now be described. If switches 83a and 79 are turned ON, data stored in register 200a is input to first ALU input port 84. If switches 84b, 77, 71b and 75 are turned ON, data stored in register 200b is input to second ALU input port 85. Operation of ALU 100 is selected by an external control signal (not shown) and ALU 100 executes the arithmetic or logic operation with respect to the data input at first and second ALU input ports 84 and 85.

As described above, the digital operation unit according to the present invention can easily execute a variety of complex arithmetic and logical operations without assistance of an external memory, by adopting a plurality of registers to control the transmission of data stored in the respective registers. Data shifting is, thus reduced, thereby improving the overall operation speed.

The foregoing embodiment is given by way of example. The scope of the present invention is defined by the appended claims.

What is claimed is:

1. A digital operation unit comprising:
   an arithmetic logic unit (ALU) receiving data from a data bus via first and second ALU input ports, and generating results of arithmetic and logical operations of the data;
   a plurality of registers storing the results;
   a plurality of first switches connected between the ALU and the plurality of registers, and controlling transmission of data between the ALU and the plurality of registers;
   a plurality of second switches connected between the plurality of registers and the first ALU input port, and controlling transmission of data between the plurality of registers and the first ALU input port; and, a plurality of third switches connected in parallel with the plurality of second switches between the plurality of registers and the data bus, and controlling transmission of data between the plurality of registers and the data bus.

2. A digital operation unit as claimed in claim 1, further comprising:

a fourth switch connected between the plurality of second switches and the first ALU input port, and controlling transmission of data between the plurality of registers and the first ALU port; and, a fifth switch connected between the plurality of third switches and the data bus, and controlling transmission of data between the plurality of registers and the data bus.

3. A digital operation unit as claimed in claim 2, wherein the fourth and fifth switch comprise CMOS transmission gates.

4. A digital operation unit as claimed in claim 1, wherein the plurality of first switches comprise CMOS transmission gates.

5. A digital operation unit as claimed in claim 1, wherein the plurality of second switches comprise CMOS transmission gates.

6. A digital operation unit as claimed in claim 1, wherein the plurality of third switches comprise CMOS transmission gates.

* * * * *